Oct. 28, 1952   E. J. BUSH   2,616,067
THERMOSTATIC CONTROL DEVICE
Filed Aug. 29, 1946   8 Sheets-Sheet 1

Fig. 1

INVENTOR
Edward John Bush
By
Attorneys

Oct. 28, 1952  E. J. BUSH  2,616,067
THERMOSTATIC CONTROL DEVICE
Filed Aug. 29, 1946  8 Sheets-Sheet 4

INVENTOR
Edward John Bush
By [signature]
Attorneys

Oct. 28, 1952 E. J. BUSH 2,616,067
THERMOSTATIC CONTROL DEVICE
Filed Aug. 29, 1946 8 Sheets-Sheet 6

Fig.6.

INVENTOR.
Edward John Bush
By
Attorneys

Oct. 28, 1952 — E. J. BUSH — 2,616,067
THERMOSTATIC CONTROL DEVICE
Filed Aug. 29, 1946 — 8 Sheets-Sheet 7

FIG. 8

INVENTOR
EDWARD JOHN BUSH
BY
ATTORNEYS

Patented Oct. 28, 1952

2,616,067

UNITED STATES PATENT OFFICE 2,616,067

THERMOSTATIC CONTROL DEVICE

Edward John Bush, Sunbury-on-Thames, England

Application August 29, 1946, Serial No. 693,790
In Great Britain January 15, 1945

Section 1, Public Law 690, August 8, 1946
Patent expires January 15, 1965

1 Claim. (Cl. 318—31)

This invention relates to thermostatic control devices for actuating a flap, shutter, valve or other control element, and more particularly to devices of the kind comprising a thermostatically controlled, change-over or reversing switch adapted upon variation of the controlling temperature to close selectively, and preferably through relays, the control circuits of a motor, jack or equivalent power device by which the control element is moved in the desired direction, and a cam-operated, follow-up device which is moved in accordance with the movements of the element under control and re-opens the change-over switch, said mechanism constituting an inching control by means of which the movement of the control element from fully open position to fully closed position and vice versa is broken up into a series of steps thereby ensuring at all times a position of the control element in substantial accordance with prevailing thermal conditions.

In the use of mechanism of this kind and particularly where employed for actuating radiator or cooler flaps on aircraft, various modifications have been made and/or various auxiliary controls or refinements have been incorporated from time to time to meet special requirements, such modifications and additions including, for example, adaptation of the control mechanism to respond to variations of temperature at one or at two or more points of the aircraft engine, provision of an additional cam for defining the number of steps into which the travel of the flap is broken and provision of a manual override control by means of which the flap may be brought to and maintained in a predetermined position irrespective of the thermal control mechanism, and heretofore it has been the practice to design a separate instrument for each particular set of conditions or requirements.

It is an object of the invention to provide an improved form of change-over switch and switch operating mechanism for use in control means of the above kind.

Another object of the invention is to provide a novel form of variable lift cam by means of which the operating temperature range of the instrument may be adjusted according to the requirements of the particular cooling or other system to be controlled.

According to the invention the improved thermostatic control device comprises a reversing or change-over switch adapted upon closure to initiate movement of the element under control, an axially movable element adapted to operate said switch, said element being responsive to movements of a thermally sensitive device or devices disposed externally of or remote from the control device, and a cam movable with the element under control and operable through intermediate mechanism to re-open the said switch for the purpose of enabling the control mechanism as a unit to operate as an inching control capable of operating alone or in conjunction with an auxiliary control or controls.

A practical embodiment of the invention will now be described with reference to the accompanying drawings wherein.

The device illustrated in the drawings will be described in its application to the control of a flap or similar air deflecting means used for regulating the flow of air through the radiator or cooler of an aircraft engine. In such control means the flap is driven by a reversible electric motor or jack or an electromagnetically controlled, fluid pressure jack under control of the thermostatically operated switch mechanism, said switch mechanism controlling the operation of the power device through relays which are only shown in outside view in the drawings as they may be of any suitable type and their construction forms no part of the present invention. The power device, such as an electric motor, and the leads to the switch and relay mechanisms are shown in the diagram, Fig. 9, which will be hereinafter described.

Referring now to the drawings, the main supporting structure consists of a back plate 1 upon the upper portion of which is mounted the relay mechanism 2 comprising solenoid operated switches of any suitable known type controlled by the thermal switch and the circuits of which control the flap or other element to be controlled. From the lower portion of the back plate extend a pair of spaced vertical walls 3 bridged at their forward edges by a plate 4. Extending between the plates 3 is a horizontal axially movable rod 5 screw threaded at its forward end to receive a nut or sleeve 6 and inwardly of the sleeve 6 a bearer ring 7 is loosely mounted on the rod for a purpose mentioned hereafter. The rod 5 extends rearwardly through the back plate 1 and is formed at its rear end with a head 9 for engagement by the thermal element or thermal element structure hereafter described. Mounted behind the wall 1 is an apertured flanged disc 8a which encircles the rod 5, said disc being formed integral with a bush 8b received within an aperture of the back plate and slotted to co-act with a pin 8 extending diametrically through the rod 5 to prevent rotation of the rod. Rotation of the disc is prevented by the provision of a pin 8c secured in the back plate and engaging a radial slot 8d in the face of the disc. The rod is urged rearwardly to hold it in engagement with the thermal element structure by a spiral compression spring 10, said spring bearing at one end against a bearer disc 10a mounted within the flanged disc 8a and at its other end against a bearer ring 10b fast on the rod 5. The forward end of the sleeve 6 is rotatably supported in the plate 4 and the rear end of the rod 5 is located by the bearer disc 10a which is apertured to provide a close but sliding fit on the rod.

An improved and simplified form of change-over switch is employed consisting of a spring blade 11 fixed at its upper end and carrying at its lower end a contact 12 movable between a pair of fixed opposed contacts 13, 13a, the contact 13 being carried in a screw-threaded plug or otherwise adjustably mounted in its support in order that the gap between the opposed contacts may be varied. The movable contact blade 11 is actuated by a push rod 14, the blade being held in engagement with the end of this rod by a light spring loaded plunger 15.

Supported below the change-over switch is a follow-up cam 16 carried fast on a shaft 17 which extends through and is rotatably supported in the walls 3, one end of the shaft carrying an arm 18 adapted to be linked to the flap or like control element so that the cam is rotated in strict accord with the movements of the flap. Preferably, a friction clutch is interposed between the arm 18 and shaft 17 to prevent the control mechanism being accidentally strained by excessive movement of the arm 18 during installation or servicing, the form of clutch shown consisting of a longitudinally split sleeve 19 fast with the arm 18 and embracing the end of the shaft, and an encircling helical spring 20 for holding the sleeve in frictional contact with the shaft.

To inter-relate the control elements above described the following means are provided. Pivotally mounted on a spindle 21 journalled in the walls 3 is a channel-shaped lever 22, the base of the channel being apertured as at 23 to permit the rod 5 to extend therethrough and the lower end of the lever being attached to a follower arm 24 under control of the cam 16. The follower arm is loaded by a light spring 25 and preferably a ball contact with the cam is provided as at 26. Pivoted by a spindle 27 to the upper end of lever 22 is a second channel-shaped member 28 the lower end of which constitutes a switch actuating arm and for this purpose bears against a knob 29 on the end of the push rod 14. This member 28 is also apertured as at 30 to permit the rod 5 to extend therethrough and is provided with a pressed-up ridge 31 forming a fulcrum edge which is held in engagement with the bearer ring 7 by a spring 32, the latter being disposed between the member 28 and a seating ring 33 bearing against the pin 8. Thus movement imparted to the rod 5 by the thermally responsive means causes the member 28 to move around its pivot 27 and so close the switch contacts 11, 13 or 11, 13a to set the flap driving unit into motion in the appropriate direction. The subsequent rotation of the cam 17, derived from the movement of the flap, now rocks the lever 22 about the pivot 21 thereby moving the pivot pin 27 and so rocking the switch actuating member 28 about the fulcrum edge 31 until the lower end of said member at its point of contact with the knob 29 re-assumes its initial position and the switch re-opens.

The mechanism so far described constitutes a simple but effective inching control but the device illustrated embodies two additional improvements or refinements which increase its range of utility and its efficiency in operation under varying conditions. In mechanism of the kind referred to, the lift of the cam per unit of angular movement determines the length of temperature range corresponding to full flap movement and there is shown in the drawings a novel or improved form of variable lift cam by means of which the operating temperature range of the instrument may be accurately adjusted and set to accord with the requirements of the particular cooling or other system to be controlled. As shown the cam 16 consists of a cylindrical member bored eccentrically to receive the shaft 17, the bore being cut at a small angle to the axis of the cylindrical periphery of the cam whereby when the cam is mounted upon the shaft its degree of eccentricity or lift increases progressively from one end of the cam to the other. The cam is slidably mounted on the shaft so that it may be adjusted to bring the desired portion of its periphery into co-operation with the follower 26 and is retained in its set position by a grub screw 34. It will be understood, that the reverse arrangement may be used, namely, the cam may be fixedly secured upon the shaft, the cam follower being laterally adjustable upon the follower arm 24 so that it may be set to engage any desired part of the cam.

Means is provided to compensate for variations of ambient temperature at the thermal head. Where a thermally sensitive element of the liquid charged type is used, it has been found that the considerable variations of atmospheric temperature such as are experienced, for example, on aircraft, acting upon the portion of the charge within the bellows or thermal head, cause undesired expansion and contraction of said bellows and has the effect of raising or lowering the operating temperature range, that is, at low ambient temperatures the contraction of the thermal head causes the flap or other control elements to reach its limits of movement at higher control temperatures than those desired whilst high ambient temperatures causes said limits to be reached at lower control temperatures. The present device includes means for overcoming this defect and for this purpose the switch actuating mechanism includes a bimetallic device acting in opposition to the action of the bellows under ambient temperature variations. In the form shown the follower arm 24 is formed of bimetal strip and constitutes the compensating device, the said device operating as follows:

With a rise or fall in the ambient temperature, the expansion and contraction of the bellows is transmitted in the usual manner through the axially movable rod 5 to the switch actuating lever 28, but the action of said temperature variation on the bimetallic arm 24 causes the lever 22 to rock about its pivot 21 and to move the pivot 27 of the switch actuating lever 28 in the direction such that the position of the lower end of said lever remains unaltered and no movement is imparted to the change-over switch.

Bimetal strip having the desired thermal characteristics has been found to lack the degree of rigidity necessary to ensure accurate control of the switch by the follow-up cam, and it is preferred, therefore, to construct the arm 24 of two or more plies of bimetal. In the form illustrated the arm 24 is duplicated by a second strip 24a which is secured at one end together with arm 24 to the lever 22 and has a point engagement with the arm 24 at its other end.

It will be appreciated that for best results the bimetal device should be mounted as close as possible to the thermal head so that they are subject to the same ambient temperature and to avoid excessive compensating movements it is preferred to reduce the volume of the bellows to a minimum by the use of a dished end wall or equivalent means.

Figure 6:
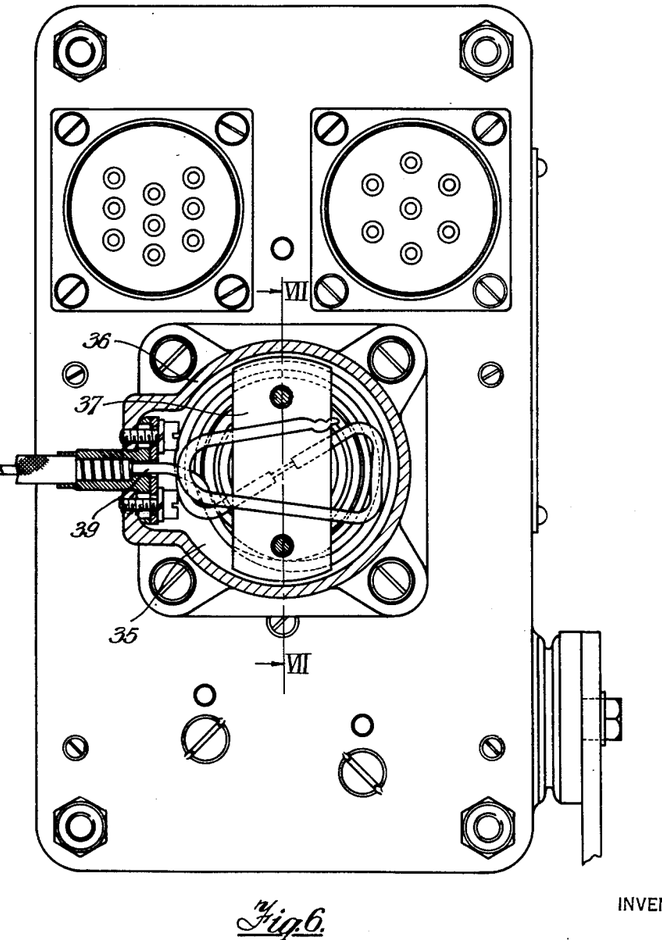
Figure 6 is a part sectional rear elevation showing the device adapted for operation by a single thermal element.
Figure 7:
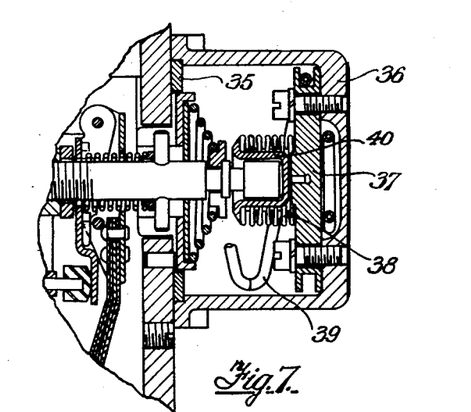
Figure 7 is a fragmentary section on the line VII—VII of Figure 6.

The mechanism so far described constitutes the basic control unit and the manner in which it may be adapted to meet different sets of conditions or requirements will now be given.

Where the control device is to operate with a single thermal element the arrangement shown in Figs. 6 and 7 is employed. Detachably mounted on the rear side of the back plate 1 is a thermal head unit consisting of a base plate 35, an enclosing cover 36, a supporting plate 37 carried on the inside of the cover and a bellows or thermal head 38 mounted on said plate, the bellows being connected by a capillary tube 39 to a phial (not shown) mounted in or adjacent the engine cooling system or other point of temperature control. The movable end wall 40 of the bellows is preferably dished as shown to reduce the internal volume of the bellows to a minimum and to provide a stop for limiting compression of the bellows, and the disposition of the bellows is such that this dished end wall forms a seating for engagement by the head 9 on the rod 5.

Figure 8:
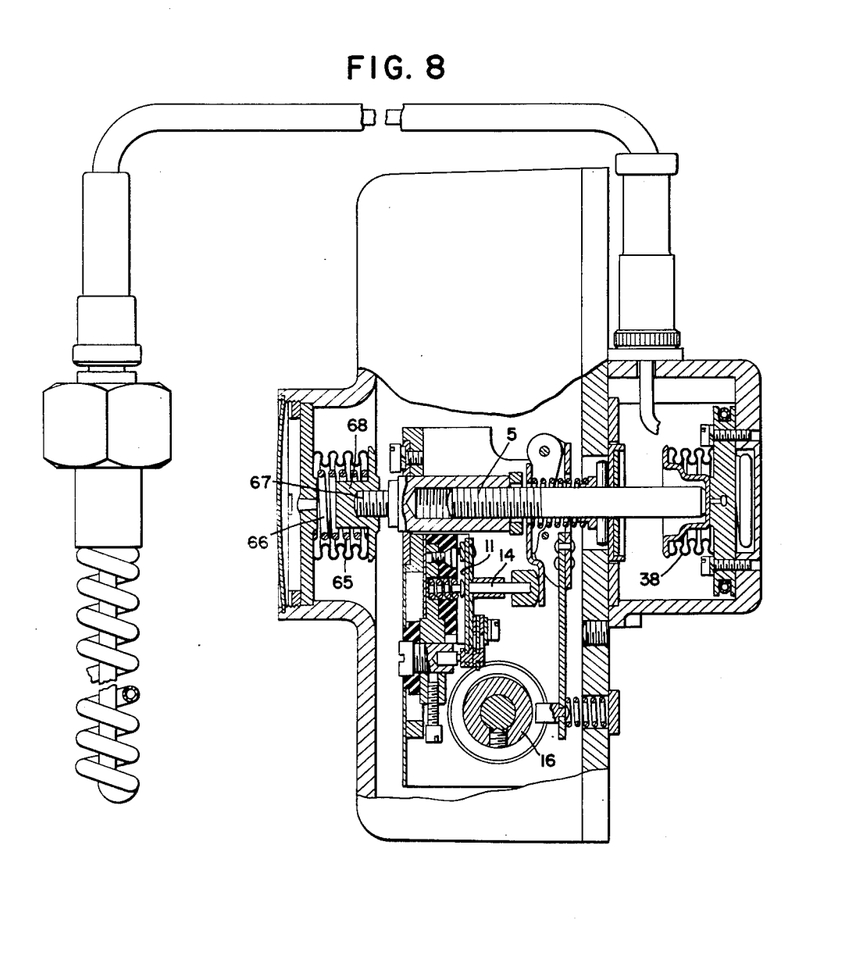
Figure 8 is a sectional view showing the control device provided with altitude compensating means.

If the thermal element is of the vapour pressure type a second bellows, evacuated and spring loaded, may be mounted below the thermal head 38 and be operatively coupled therewith in known manner to render the thermal element independent of changes of external pressure and so form an altitude compensating device. This compensating device as shown in Fig. 8 comprises an evacuated bellows 65 loaded by a spring 66 operatively connected by a pin 67 projecting from the sleeve 6 and engaging the movable end wall 68 of the compensating bellows, the latter being thus connected to the axially movable rod 5 so that ambient pressure acting on this bellows and on the thermal head bellows 38 cancel out each other and thereby render the thermostatic control independent of altitude changes. The thermal head unit so constructed would be interchangeable with the unit shown in Figs. 6 and 7.

Figure 1:
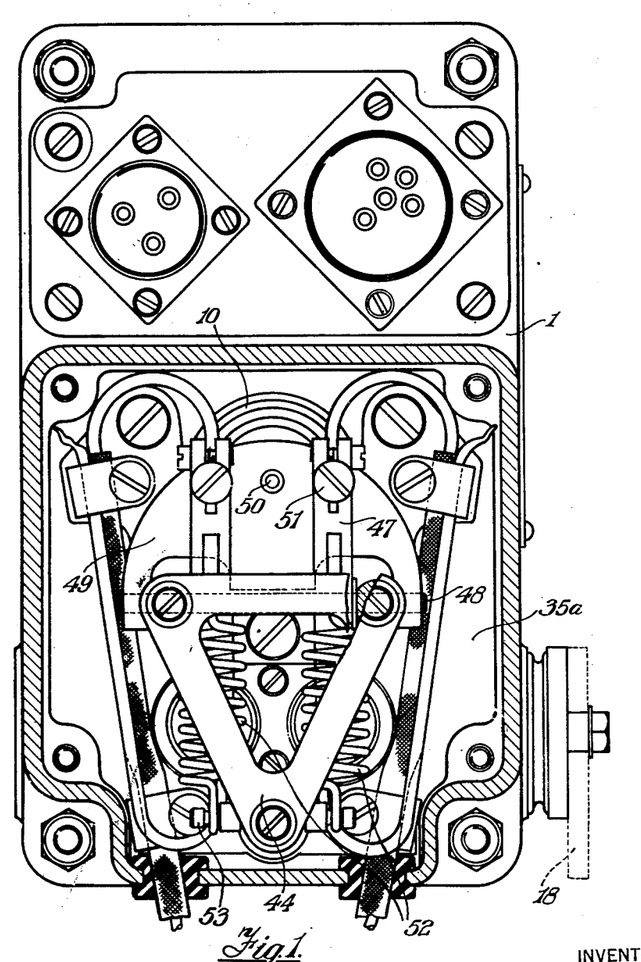
Figure 1 is a rear elevation of the device with the thermal head casing in section and showing an arrangement wherein two thermal elements are employed responsive to temperature variations at two different points of control.
Figure 2:
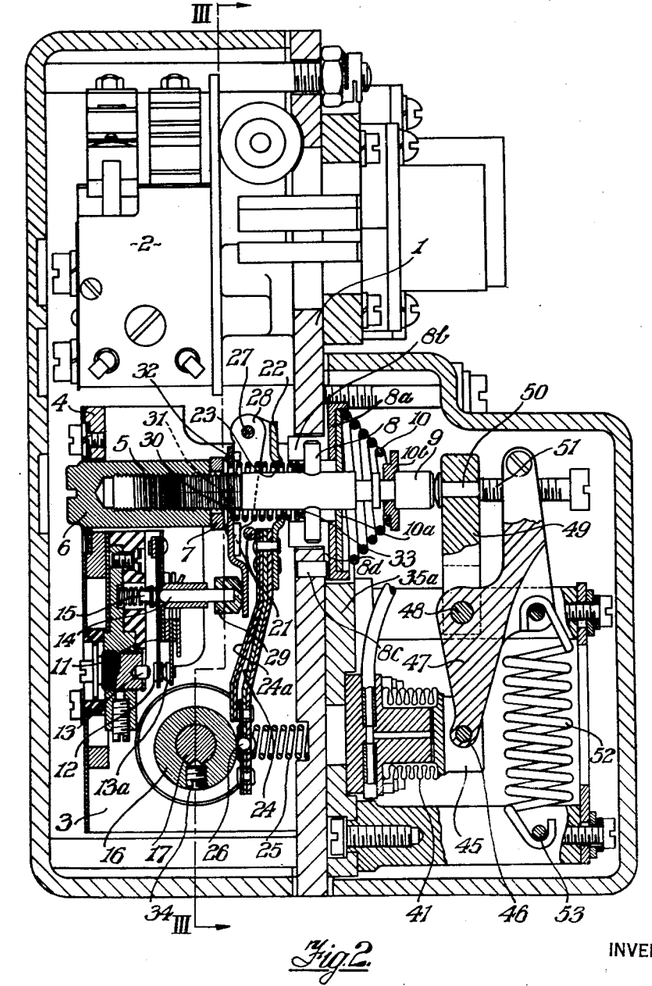
Figure 2 is a sectional elevation viewed at right angles to Figure 1.
Figure 5:
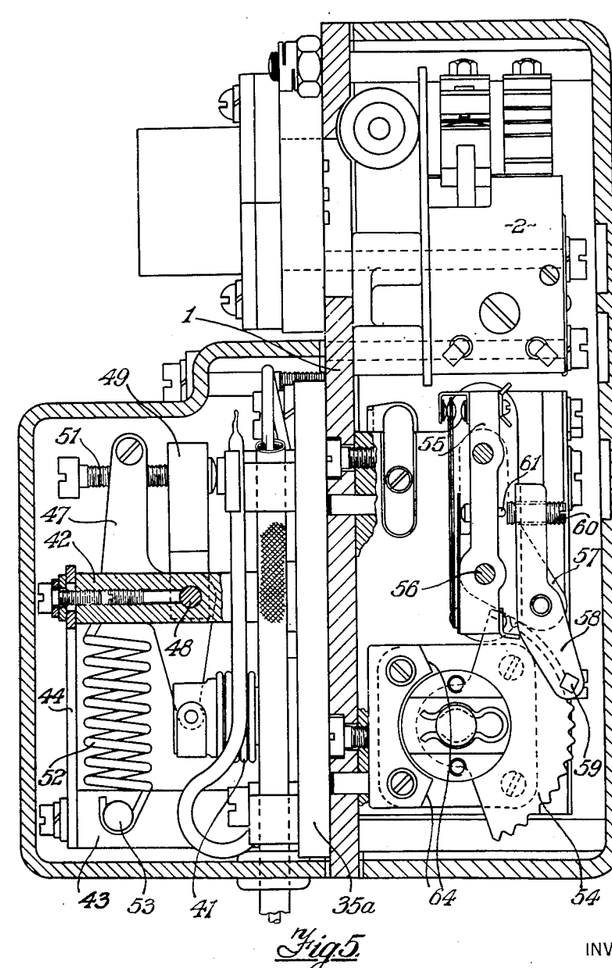
Figure 5 is a sectional elevation viewed from the opposite side to that shown in Figure 2 and showing an auxiliary control mechanism in outside elevation.

Figs. 1, 2 and 5 show the control device adapted for operation by two thermal elements responsive to the temperature at different points in the engine cooling or other system under control, the arrangement being such that the thermal element which is responsive to a higher temperature, if a temperature difference exists, becomes the overriding control whilst either element will continue to exercise control should the other become inoperative. In the thermal head unit shown the two bellows 41 are mounted side by side upon the lower part of the base plate 35a and are connected in the usual manner to their points of temperature control, and also carried by the base plate is a pair of upper horizontally projecting pillars 42 and a lower pillar 43, said pillars being braced at their outer ends by a frame or plate 44. The movable heads 45 of the bellows are pivotally attached at 46 to the lower ends of rocking levers 47 mounted upon a shaft 48 carried by the pillars and also mounted for pivotal movement upon this shaft is a thrust plate 49 carrying a stud 50 positioned to abut the head 9 of the rod 5. The upper ends of the levers 47 carry abutments 51 screwed or otherwise adjustably mounted on the levers and adapted to engage the thrust plate 49, and tension springs 52 extending between the levers 47 and anchoring pins 53 on the pillar 43 serve to load the bellows. The construction and mounting of the levers 47 and thrust plate 49 are of a sufficiently rigid character to ensure that the thrust of either bellows will be accurately transmitted to the axially movable rod 5 irrespective of any equal or lesser thrust exerted by the other bellows.

It will be noted that in this construction also there is no permanent connection between the axially movable rod and the thermal heads so that to change from one thermal control unit to another merely necessitates the removal of one unit and the substitution of another, the back plate being appropriately drilled for this purpose and dowel pins being used if desired to ensure accurate location of the units.

In control mechanism of the kind mentioned it is often desirable to regulate the number of steps into which the full range of flap travel is broken by the provision of a hold-on circuit for the relays and a notched cam movable with the follow-up cam and adapted to actuate a snap-over switch or similar device to break the hold-on circuit intermittently and at predetermined intervals. To apply such control to the instrument above described the notched cam 54 is mounted fast upon one end of the cam shaft 17 (see Figs. 3–5) and the snap-over switch 55 is detachably mounted by means of bolts 56 upon one of the walls 3, the switch being clamped between a pair of plates 57 which also support a spring controlled, pivoted follower 58 carrying at one end a pin 59 engaging the notched periphery of cam 54 and at the other end a screwed pin 60 engaging the actuating pip 61 of the switch.

Figure 3:
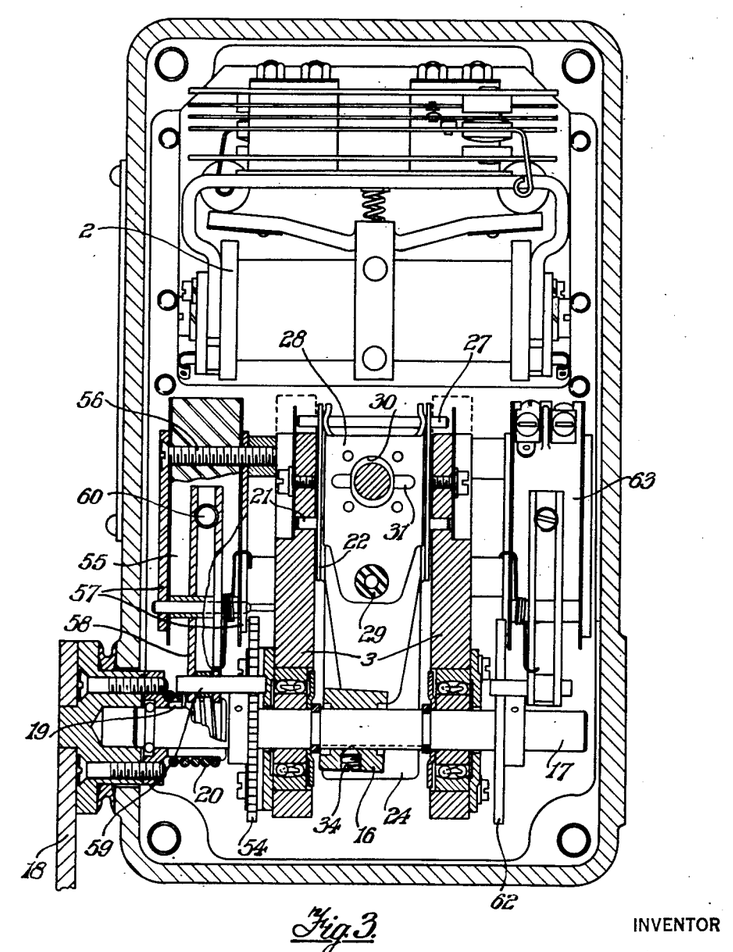
Figure 3 is a sectional elevation taken on the line III—III of Figure 2.
Figure 4:
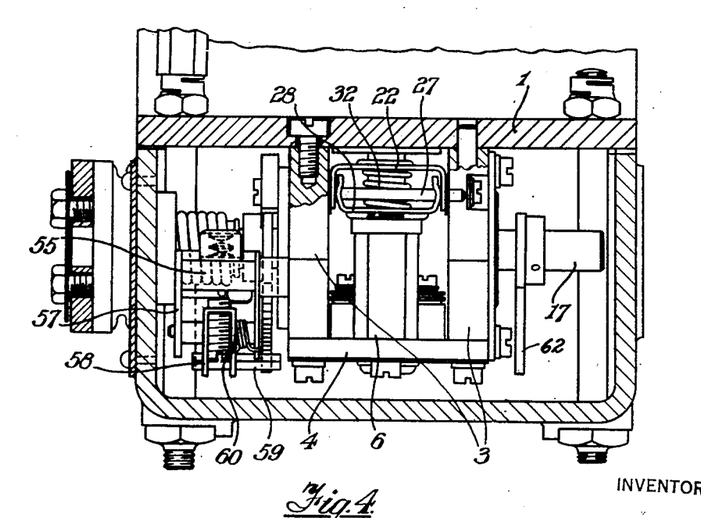
Figure 4 is a sectional plan view of the inching control unit.

Means may also be provided for opening the hold-on circuit as the flap or other control element approaches either end of its range of travel, said means in the preferred form consisting of a further cam movable with the follow-up cam and operable through a pivoted follower to open a switch in the hold-on circuit at the desired points of flap travel. Such means may also be embodied in the present instrument as shown in Fig. 3, the additional cam 62 being mounted upon the other free end of the cam shaft 17 and the switch 63 being removably mounted upon the other wall 3 for operation by a spring controlled, pivoted follower in a manner similar to the switch 55.

Figure 9:
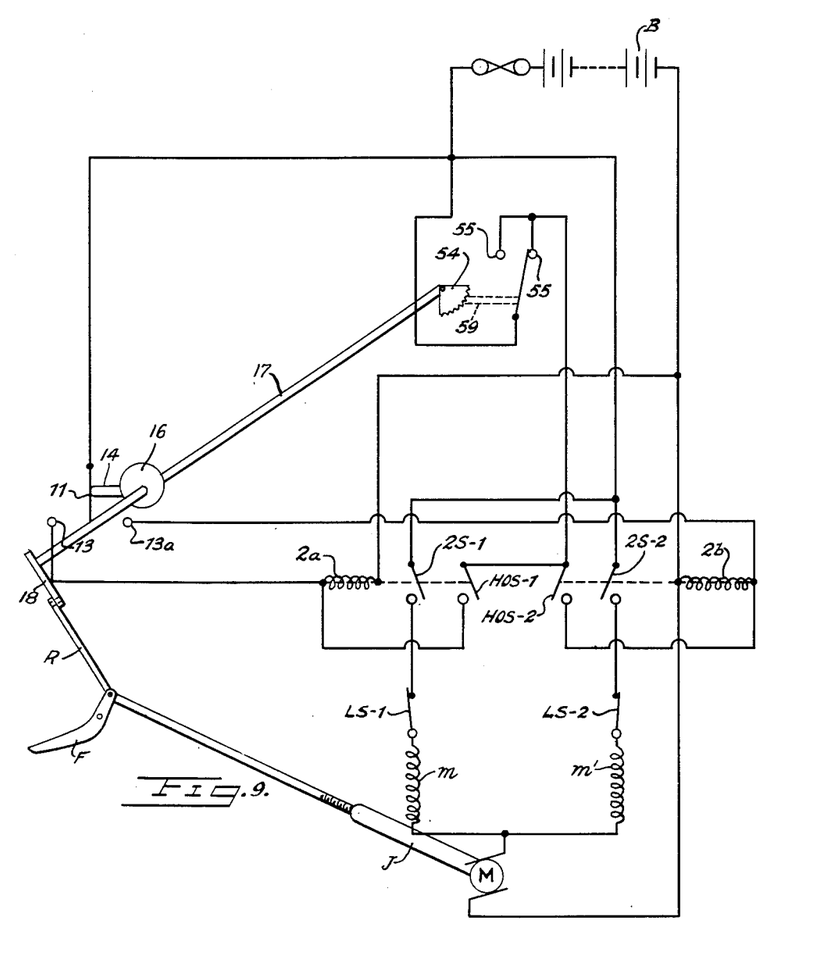
Figure 9 is an electrical diagram showing the motor and the elements of the control device connected therein.

A diagram of the motor or power device for the radiator flap F or other element to be operated and controlled, and elements of the control device and their circuits is shown in Fig. 9 wherein M represents a reversible electric motor, having field windings $m$ and $m'$, for driving a screw jack J connected to the radiator flap for actuating it, the radiator flap being linked by a rod R to the arm 18 fixed to the shaft 17 which carries the follow-up cam 16 and the notched cam 54 whereby movements of the radiator flap are transmitted to said cams. B represents an electric battery or other source of current for operating the motor M and energizing the circuits and elements therein, and LS-1 and LS-2 represent limit switches for determining the extent of movement of said radiator flap or element in each direction. Relays 2a and 2b control switches 2S-1 and 2S-2 respectively for closing the motor field circuits, and the thermostatically operated change-over switch comprising the movable switch lever 11 and cooperating contacts 13 and 13a and cam 16 and push rod 14, upon a change of controlling temperature, closes one or the other of the relay circuits. The relays also control additional switches HOS-1 and HOS-2 arranged in a hold-on circuit and are operable upon closure of either of the relay circuits to maintain the relay energized irrespective of opening of the change-over switch. The two contacts of the snap-over switch are designated 55, and 59 represents the follower for the notched cam 54 for operating the snap-over switch to momentarily interrupt and re-establish the hold-on circuit and thereby produce the step-by-step or inching movement of the radiator flap or element to be operated and controlled.

Under relatively normal conditions, that is, small temperature fluctuations at the control point, a temperature change will cause the switch blade 11 to engage, for example, contact 13, thereby energizing relay 2a and closing motor circuit switch 2S-1 and holding circuit switch HOS-1. The motor will then run in the appropriate direction to move the flap or other element under control to modify the temperature in the appropriate direction at the control point, and switch 11, 13 will open, but the flap will continue to move until the holding circuit is broken at switch 55. Under such a change in temperature conditions at the control point, the flap moves only a predetermined step, the degree of movement of each step being fixed by the spacing of the notches in cam 54. In the case, however, of substantial temperature fluctuations at the control point, such that there is still a state of temperature unbalance when cam 54 momentarily opens switch 55, while switch 11, 13 remains closed, the flap will continue to move until the system is balanced, whereupon the switch 11, 13 and switch 55 will open, de-energizing the relay 2a and opening the motor switch 2S-1 and holding switch HOS-1. If the temperature at the control point requires modification thereof in the other direction, such modification will be effected by engagement of the switch blade 11 with its other contact 13a which controls the relay 2b and the holding circuit switch HOS-2 and the motor switch 2S-2 for the running of the motor in the other direction. In all cases, movement of the flap or other element to be controlled is started by the closure of switch blade 11 with contact 13 or 13a, and is terminated by the opening of switch 55.

If a manual override control is required, a disc or barrel carrying contact strips may be secured, with means for angular adjustment, on the cam shaft 17 and a plurality of wiper blades may be removably supported to co-operate therewith in such manner that when the flap is at other than the desired "preset" position, a circuit will be closed to set the flap driving means in operation to move the flap towards this position, the wiper blades disengaging the said contact strips to break the circuit when the desired flap position is reached.

Where an auxiliary cam 54 or 62 is used, it is arranged to co-act with fixed abutments 64, see Fig. 5, to form stops for limiting the angular movement of the cam. If such auxiliary control is not provided a plain sector or equivalent stop means is secured upon the cam shaft to co-operate with abutments 64 for limiting cam rotation.

I claim:

In a device for operating and controlling the movement of an element, electrical means for operating said element, a shaft connected to said element for movement therewith, a control cam of cylindrical form bored longitudinally at an angle to its axis to receive said shaft and having means for connecting it to said shaft to rotate therewith, the degree of eccentricity of the cam increasing progressively in a direction from one to the other end thereof, and a thermally operated member cooperative with the cam for movement thereby and having contacts connected in circuit with said electrical means for controlling the operation of the latter and said element, said cam and cooperative member being relatively displaceable in a direction axially of said cam for engagement between the cam and said member selectively at different points along the length of the cam to thereby vary the extent of relative movement between said contacts per unit of angular rotation of said cam.

EDWARD JOHN BUSH.

REFERENCES CITED

The following references are of record in the file of this patent:

UNITED STATES PATENTS

| Number | Name | Date |
|---|---|---|
| 1,978,362 | Fonseca | Oct. 23, 1934 |
| 2,053,885 | Weeks | Sept. 8, 1936 |
| 2,055,280 | Dodson | Sept. 22, 1936 |
| 2,077,086 | Adair | Apr. 13, 1937 |
| 2,197,230 | Waddell | Apr. 16, 1940 |
| 2,395,604 | Yeida | Feb. 26, 1946 |
| 2,404,455 | Persons | July 23, 1946 |
| 2,437,551 | Penn | Mar. 9, 1948 |
| 2,459,349 | Weber | Jan. 18, 1949 |
| 2,459,350 | Weber | Jan. 18, 1949 |
| 2,502,023 | Persons | Mar. 28, 1950 |